(12) United States Patent
Biehl et al.

(10) Patent No.: US 10,812,494 B2
(45) Date of Patent: Oct. 20, 2020

(54) SYSTEMS AND METHODS FOR SECURE LOCATION-BASED DOCUMENT VIEWING

(71) Applicants: FUJI XEROX CO., LTD., Tokyo (JP); Fuji Xerox Australia Pty Limited., Macquarie Park (AU)

(72) Inventors: Jacob Biehl, San Jose, CA (US); Lynn Donelle Wilcox, Redwood City, CA (US); William van Melle, Los Altos, CA (US); Lucas Peter William Carrigan, Oyster Bay (AU)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/580,175

(22) Filed: Dec. 22, 2014

(65) Prior Publication Data

US 2016/0182529 A1 Jun. 23, 2016

(51) Int. Cl.
*H04L 29/06* (2006.01)
*H04W 4/029* (2018.01)
*H04W 12/08* (2009.01)
*H04W 12/00* (2009.01)

(52) U.S. Cl.
CPC .......... *H04L 63/107* (2013.01); *H04W 4/029* (2018.02); *H04W 12/08* (2013.01); *H04W 12/00503* (2019.01)

(58) Field of Classification Search
CPC ....... H04L 63/102; H04L 63/20; H04L 63/08; H04L 63/107; G06F 21/6218; H04W 12/00503; H04W 4/029
USPC .............................................. 726/1, 2, 4, 17
See application file for complete search history.

(56) References Cited

U.S. PATENT DOCUMENTS

| 6,181,253 | B1 * | 1/2001 | Eschenbach | G08B 21/0261 340/10.1 |
| 8,509,734 | B1 * | 8/2013 | Gupta | G06Q 20/3224 455/405 |
| 8,639,552 | B1 * | 1/2014 | Chen | G06F 9/4881 705/7.21 |
| 9,213,845 | B1 * | 12/2015 | Taraki | G06F 21/60 |
| 2002/0177449 | A1 * | 11/2002 | McDonnell | G06F 21/00 455/456.1 |

(Continued)

OTHER PUBLICATIONS

"Ensuring Document Security Across Any Device with the WatchDox Platform", http://www2.watchdox.com/wp/wp-content/uploads/2013/03/WatchDox-Security-White-Paper.pdf.

(Continued)

*Primary Examiner* — Ali S Abyaneh
(74) *Attorney, Agent, or Firm* — Procopio, Cory, Hargreaves & Savitch LLP

(57) ABSTRACT

A computer-implemented method, the method being performed in a computerized system incorporating a central processing unit, a localization signal receiver, a display and a memory, the computer-implemented method involving: receiving a request from a user for a content; receiving at least one localization signal using the localization signal receiver; determining a location based on the received localization signal; using a plurality of content access rules to determine whether the requested content is authorized to be accessed from the determined location; and providing content to the user only if the content is authorized to be accessed from the determined location.

21 Claims, 7 Drawing Sheets

(56) References Cited

U.S. PATENT DOCUMENTS

| | | | |
|---|---|---|---|
| 2003/0217122 A1* | 11/2003 | Roese | G01S 5/02 709/219 |
| 2005/0272445 A1 | 12/2005 | Zellner | |
| 2007/0027809 A1* | 2/2007 | Alve | H04L 63/08 705/51 |
| 2010/0088746 A1 | 4/2010 | Kota et al. | |
| 2011/0143716 A1* | 6/2011 | Shaw | H04M 1/65 455/411 |
| 2012/0137130 A1 | 5/2012 | Vainstein et al. | |
| 2012/0284779 A1* | 11/2012 | Ingrassia, Jr. | G06F 21/70 726/5 |
| 2013/0018826 A1* | 1/2013 | Sundararajan | H04L 12/6418 706/12 |
| 2013/0040657 A1 | 2/2013 | Jackson | |
| 2013/0074169 A1 | 3/2013 | Nuzzi | |
| 2013/0080048 A1* | 3/2013 | Kim | H04W 4/021 701/431 |
| 2013/0219458 A1* | 8/2013 | Ramanathan | G06F 21/10 726/1 |
| 2013/0251374 A1* | 9/2013 | Chen | H04B 10/116 398/118 |
| 2014/0087752 A1* | 3/2014 | Zhu | H04W 24/00 455/456.1 |
| 2014/0189802 A1* | 7/2014 | Montgomery | H04L 63/08 726/4 |
| 2014/0189804 A1 | 7/2014 | Lehmann et al. | |
| 2014/0207517 A1* | 7/2014 | Oshima | H04N 5/2356 705/7.29 |
| 2014/0214668 A1* | 7/2014 | Lotter | H04L 63/20 705/41 |
| 2015/0099539 A1* | 4/2015 | Titus | H04W 64/00 455/456.1 |
| 2015/0121464 A1* | 4/2015 | Hughes, Jr. | H04L 63/105 726/4 |
| 2015/0181384 A1* | 6/2015 | Mayor | H04W 24/02 455/456.1 |
| 2015/0221151 A1* | 8/2015 | Bacco | G06K 9/00288 340/5.83 |
| 2015/0264573 A1* | 9/2015 | Giordano | H04L 63/08 726/7 |
| 2016/0156638 A1* | 6/2016 | Somani | H04L 63/12 726/7 |

OTHER PUBLICATIONS

"Restricting the Geographic Distribution of Your Content" http://docs.aws.amazon.com/AmazonCloudFront/latest/DeveloperGuide/georestrictions.html visited on Feb. 14, 2015.

"Geo-filtering your Videos" http://support.brightcove.com/en/video-cloud/docs/geo-filtering-your-videos, visited on Feb. 14, 2015.

Jacob I. Biehl et al., LoCo: A Ready-to-Deploy Framework for Efficient Room Localization using Wi-Fi, Ubicomp '14, Sep. 13-17, 2014, Seattle, WA, USA.

Examination Report No. 1 for standard patent application, IP Australia, dated Mar. 8, 2018.

* cited by examiner

SYSTEMS AND METHODS FOR SECURE LOCATION-BASED DOCUMENT VIEWING

BACKGROUND OF THE INVENTION

Technical Field

The disclosed embodiments relate in general to document management systems and, more specifically, to systems and methods for secure location-based document viewing.

Description of the Related Art

With the increased use of mobile devices and bring-your-own-device for enterprise document access and viewing, document security has become a serious issue. Technology exists to control who views a document, when and how long they are allowed to view the document, what devices are allowed to view the document, and what IP addresses can access the document. However, it is not currently possible to control the exact indoor locations for acceptable document viewing. For example, it may be acceptable to view the document on a mobile device in the user's office or in a secure meeting room, but not in a public area in the same building. Or it may be permitted to view the document anywhere inside the building, but not outside the building.

It may also be desirable to extend the notion of secure document viewing locations to securing the document based on co-located people. For example, the document cannot be viewed unless two or more trusted users are in the same location. Alternatively, document viewing may be restricted if a person without an appropriate security clearance is present at the same location.

As would be appreciated by those of skill in the art, in view of the aforesaid deficiencies of the conventional technology, new and improved systems and methods for secure location-based document access are needed.

SUMMARY OF THE INVENTION

The embodiments described herein are directed to methods and systems that substantially obviate one or more of the above and other problems associated with conventional methods for providing secure access to documents.

In accordance with one aspect of the inventive concepts described herein, there is provided a computer-implemented method, the method being performed in a computerized system incorporating a central processing unit, a localization signal receiver, a display and a memory, the computer-implemented method involving: receiving a request from a user for a content; receiving at least one localization signal using the localization signal receiver; determining a location based on the received localization signal; using a plurality of content access rules to determine whether the requested content is authorized to be accessed from the determined location; and providing content to the user only if the content is authorized to be accessed from the determined location.

In one or more embodiments, the computer-implemented method further involves: receiving additional localization signals; updating the location based on the additional localization signals; using a plurality of content access rules to determine whether the requested content is authorized to be accessed from the updated location; and withholding content from the user if the content is not authorized to be accessed from the updated location.

In one or more embodiments, the content is a document.

In one or more embodiments, the localization signal is provided by a beacon disposed in a room of a building and wherein the localization signal includes an identifier uniquely identifying the beacon.

In one or more embodiments, the location is determined with a room-level accuracy.

In one or more embodiments, the localization signal includes a coded lighting signal and wherein the localization signal receiver is a light sensitive device.

In one or more embodiments, the localization signal includes a WIFI signal and wherein the localization signal receiver is a WIFI communication interface.

In one or more embodiments, the localization signal includes a GPS signal and wherein the localization signal receiver is a GPS receiver.

In one or more embodiments, the plurality of content access rules specify an authorized location from which the content is authorized to be accessed.

In one or more embodiments, the plurality of content access rules specify at least one identifier of additional mobile computing device required to be present at the determined location in order for the content to be authorized to be accessed.

In one or more embodiments, the plurality of content access rules comprise information identifying one or more additional mobile computing devices required to be not present at the determined location in order for the content to be authorized to be accessed.

In one or more embodiments, determining the location based on the received localization signal includes storing a location identifier corresponding to the determined location in a location database.

In one or more embodiments, determining whether the requested content is authorized to be accessed from the determined location involves querying the location database.

In one or more embodiments, determining whether the requested content is authorized to be accessed from the determined location involves sending a network request to an access control engine.

In one or more embodiments, the network request includes a requesting device identifier and a document identifier uniquely identifying the requested document.

In one or more embodiments, the computer-implemented method further involves storing information on all mobile devices present at the determined location when the content was provided to the user.

In one or more embodiments, determining a location based on the received localization signal involves determining a distance between the localization signal receiver and a source of the localization signal.

In one or more embodiments, the localization signal receiver receives at least two localization signals and selects strongest of the two received localization signals for determining the location.

In one or more embodiments, determining a location based on the received localization signal involves fingerprinting the received localization signal.

In one or more embodiments, the computer-implemented method further involves generating a searchable log comprising information on the determined location, the requested content and a current time associated with each instance of the provision of the requested content to the user.

In accordance with another aspect of the inventive concepts described herein, there is provided a non-transitory computer-readable medium embodying a set of computer-executable instructions, which, when executed in connection with a computerized system incorporating a central processing unit, a localization signal receiver, a display and a memory, cause the computerized system to perform a method involving: receiving a request from a user for a content; receiving at least one localization signal using the localization signal receiver; determining a location based on the received localization signal; using a plurality of content access rules to determine whether the requested content is authorized to be accessed from the determined location; and providing content to the user only if the content is authorized to be accessed from the determined location.

In accordance with yet another aspect of the inventive concepts described herein, there is provided a computerized system incorporating a central processing unit, a localization signal receiver, a display and a memory, the memory causing the computerized system to perform a method involving: receiving a request from a user for a content; receiving at least one localization signal using the localization signal receiver; determining a location based on the received localization signal; using a plurality of content access rules to determine whether the requested content is authorized to be accessed from the determined location; and providing content to the user only if the content is authorized to be accessed from the determined location.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement approach to securing document access based on location information. In one or more embodiments, the secure document access system and method described herein use room-level location control of document access. In one or more embodiments, an indoor localization system is used to provide location information that is capable of locating an electronic device, such as a smartphone or tablet of the user, with a room-level accuracy. Exemplary embodiments of such localization systems include systems based on Bluetooth Low Energy (BLE) technology, including either iBeacons or more general devices, all of which are well known to persons of ordinary skill in the art. In the same or alternative embodiments, WIFI or a combination of WIFI and beacon technology can also be used for providing location information for purposes of secure document access control. In yet alternative embodiments, coded lighting and/or signals from active radiofrequency near field communication (NFC) emitters (antennas) may also be used to provide localization signals to the user's mobile device 102.

Figure 1:
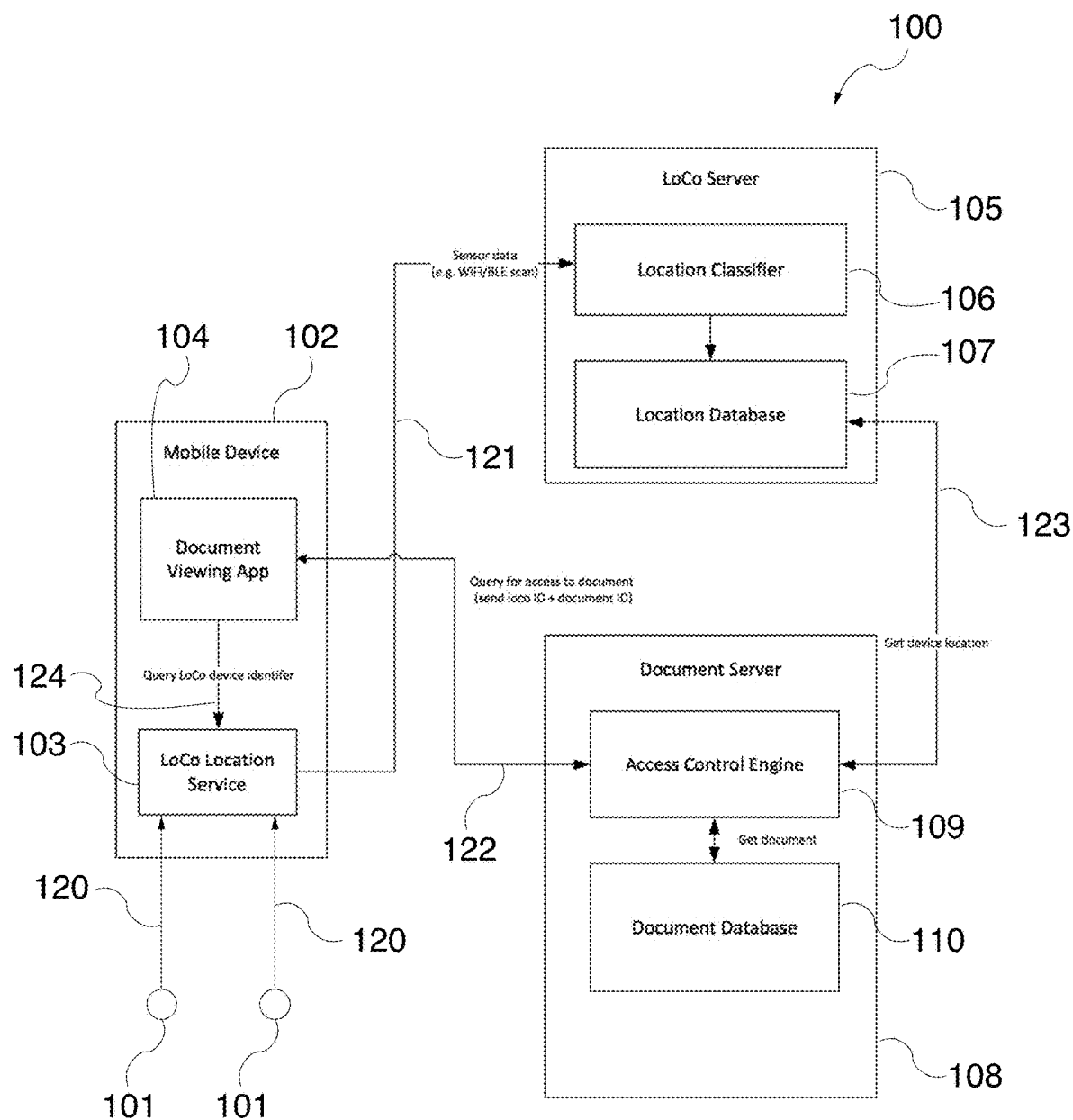
FIG. 1 illustrates an exemplary logical diagram of an embodiment of a system for secure document access control based on location information.

FIG. 1 illustrates an exemplary logical diagram of an embodiment of a system 100 for secure document access control based on location information. In one or more embodiments, one or more location devices (e.g. beacons) 101 are disposed inside and outside the user's room to assist in determining user's location within a building. The location devices 101 are configured to wirelessly transmit (broadcast) their unique identifiers 120 using, for example, Bluetooth Low Energy (BLE) technology, which are received by a receiver of a user's mobile device 102, which executes a location service application 103 and a secure document viewing application 104. Upon the receipt of the unique identifier(s) 120 from one or more location devices 101, the location service application 103 executing on the user's mobile device 102 sends one or more network transmissions 121 containing the received location device identifiers (also called sensor data) to one or more location servers 105. Each location server 105 executes a location classifier application 106 and a location database 107. The location classifier application 106 receives the unique location device identifiers (sensor data) 121 from the location service application 103 and performs an update of the user's mobile device location information stored in the location database 107 based on the received unique location device identifier(s) and the known location of each location device 101. The user's mobile device is identified in the location database 107 using a unique mobile device identifier. In various embodiments, the corresponding location information may be stored in the location database 107 in a form of a unique location identifier, which uniquely identifies location of the user's mobile device 102.

When the user selects a specific document for viewing using a document viewing application 104 executing on the user's mobile device 102, the document viewing application 104 first sends a query 124 to the location service application 103 for a unique device identifier that uniquely identifies the user's mobile device 102 for purposes of determining its location and document access permissions. In response, the location services application 103 provides the requested unique device identifier to the document viewing application 104. Subsequently, the document viewing application 104 sends a document access request 122 to an access control engine 109 executing on the document server 108. The document access request 122 contains the unique mobile device identifier as well as a unique document identifier that uniquely identifies the requested document to the document server 108.

The access control engine then sends a mobile device location request 123 containing the aforesaid unique mobile device identifier to the location database 107. The location database 107 uses the received mobile device identifier to lookup the current location of the corresponding user's mobile device 102. The location information, which may be in a form of a unique location identifier, is then returned to the access control engine 109, which compares it with a plurality of authorized document viewing locations corresponding to the specific mobile device identifier and the specific document identifier. In the event that the access from the current location is authorized, the corresponding document is retrieved (125) from the document database 110 and returned, via the network, to the document viewing application 104, which displays the retrieved document to the user.

In an alternative embodiment, the corresponding document could be stored in an encrypted form on the device. In this case, only a decryption key needs to be retrieved from the document database.

In one or more embodiments, the accuracy of the determined location of the user's mobile device 102 may be enhanced by approximating the distance from the corresponding location device(s) 101 using the measured strength of the received broadcast signal. In case of iBeacons, the distance (between transmitting iBeacon and the user's mobile device 102) is categorized into three distinct ranges:

Immediate: Within a few centimeters;
Near: Within a couple of meters; and
Far: Greater than 10 meters away.

In one or more embodiments, the access control engine 109 stores information identifying the rooms or other locations where secure document viewing is allowed. Such rooms may have one or more of the aforesaid location devices 101 installed therein. The aforesaid information may be stored in a database, such as a relational database system, or in any other suitable form well known to persons of ordinary skill in the art. In one exemplary embodiment, the specific room where user's mobile device 102 is located is identified by determining the strongest signal received from a plurality of location devices 101 (e.g. iBeacons) within this particular room.

The room or other location identifying information may be stored as a room identifier or room ID. In one or more embodiments, additional location devices 101 (e.g. iBeacons) may be used to increase confidence of determining the particular location, act as decoys to prevent and/or detect tampering, or be used to assist in knowing when a device is outside of an allowed room. For example, strong signals from one or more location devices 101 (e.g. iBeacons) known to be outside the secure room may indicate that the user's mobile device is outside of the allowed room. In one or more embodiments, in addition to signal strength only, more sophisticated classification techniques are used including, without limitation, fingerprinting of the beacon signal(s) using, for example, information supplied by the cloud authority, to verify the authenticity of the received beacon signals. In fingerprinting, a site survey determines the signal strength readings of various beacons for each location to be classified. This site survey data is then used to train a classifier that can take in new scan data (as used in the application context described) and determine the location most likely represented by that scan data.

In various embodiments, measures of confidence are used as part of the security profile (i.e. ability to balance security and utility/usability). In one or more embodiments, in addition to beacon localization, a global positioning system and/or WIFI localization are additionally used to determine the current location of the user's mobile device 102.

Figure 2:
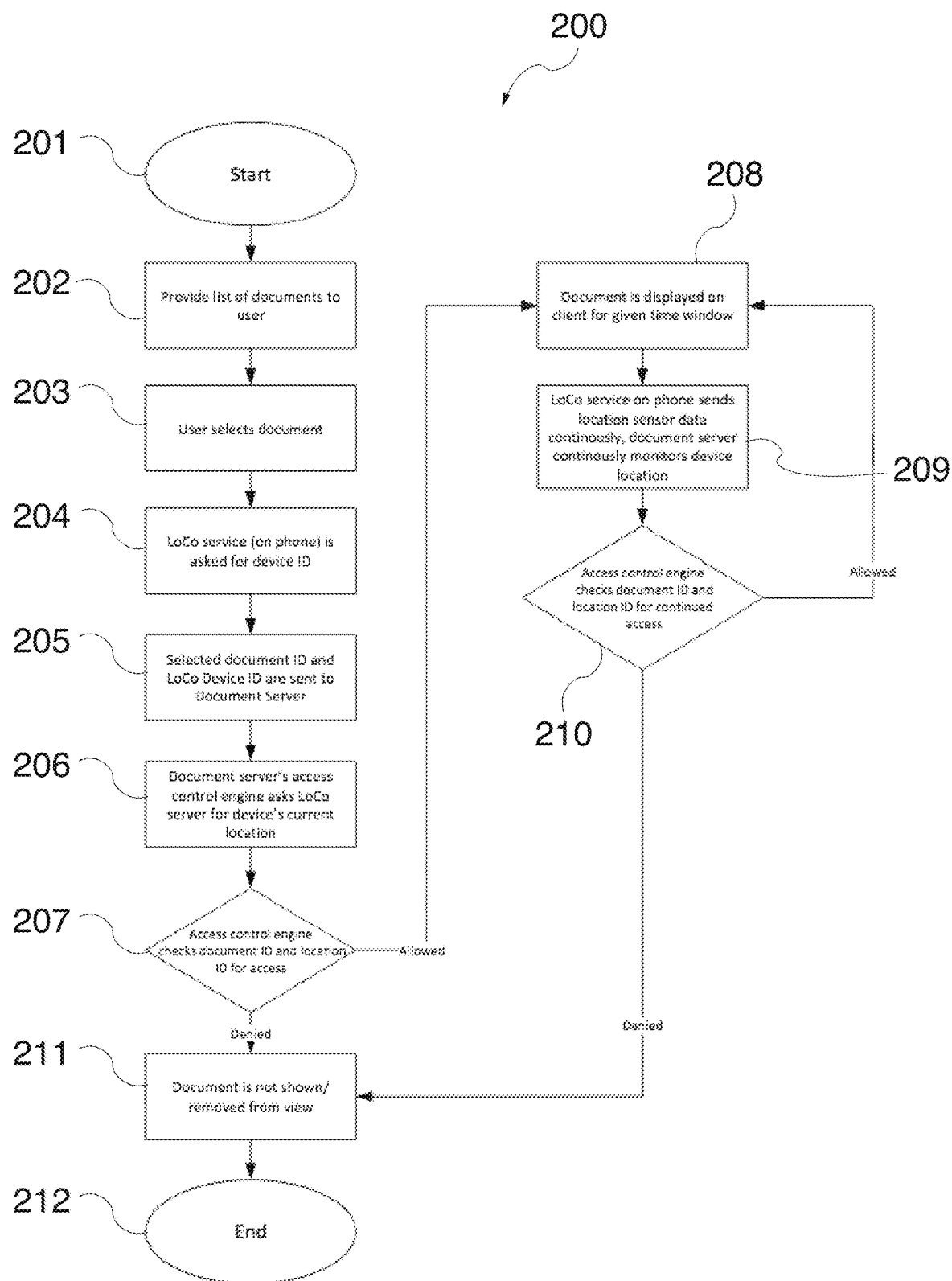
FIG. 2 illustrates an exemplary operating sequence of an embodiment of a method for secure document access control based on location information.

FIG. 2 illustrates an exemplary operating sequence 200 of an embodiment of a method for secure document access control based on location information. The operating sequence 200 starts at step 201. At step 202, the document viewing application 104 executing on the user's mobile device 102 provides a list of available documents to the user of the mobile device 102. To this end, the document viewing application 104 generates an appropriate graphical user interface of a screen of the user's mobile device 102. At step 203, the user uses the generated graphical user interface to select a specific document from the aforesaid list of available documents shown to the user.

At step 204, the document viewing application 104 requests the unique mobile device identifier from the location service application 103. At step 205, the unique identifier of the user-selected document and the unique mobile device identifier are sent to the access control engine 109 of the document server 108. At step 206, the access control engine 109 of the document server 108 requests the current location information of the user's mobile device 102 from the location server 105 using the received unique mobile device identifier.

At step 207, the access control engine 109 of the document server 108 checks the received document identifier and the location identifier against stored document access permissions. If it is determined that the document with the specific received document identifier could be accessed from the identified location, then the document is retrieved from the document database 110 and displayed to the user on the display unit of the user's mobile device 102 for a predetermined time window, see step 208. The location service application 103 continuously sends its location sensor data to the location server 105, which stores it in the location database 107. At the same time, the access control engine 109 of the document server 108 continuously queries this database 107 to monitor the location of the user's mobile device 102, see step 209. At step 210, the access control engine 109 of the document server 108 periodically checks the document identifier and the updated location identifier against stored document access permissions. If the access to the document is still allowed, the document continues being displayed to the user. Otherwise, the requested document is not shown to the user or removed from user's view, see step 211. The operating sequence 200 terminates at step 212.

When the user opens a document with the document viewing application 104, the application first sends a request to the document server 108 to determine whether the device's current location is one in which the document is authorized to be opened. While the document is open for user's viewing, the document viewing application 104 continually tests that the user's device 102 is still within the authorized area; when it no longer is, the document viewing application 104 closes the document. In one or more embodiments, the document viewing application 104 bookmarks the current position in the document, so that if the user had just inadvertently moved outside the authorized area, the user can quickly return to the last location.

In one or more embodiments, for the sake of battery efficiency on the user's mobile device 102, the location only needs to be actively monitored while the document viewing application 104 is being used. While a secured document is open on the user's mobile device 102, the location data must be sent to the location server 105 frequently enough (say, every few seconds) that the document viewing application 104 can quickly determine that the device 102 has left the authorized area and close the document. In one or more embodiments, if the location technology being used is subject to occasional false negatives (e.g., by failure to detect the beacon signal in the room), the system is configured wait for multiple readings to all show that the user's mobile device 102 has left the area before closing the document.

In one or more embodiments, in addition to setting controls that tie a document's permissions to a specific room, the described secure document access system could also be set to allow a specific class of documents to be viewed in a class of different locations. For instance, an organization could set simple rules such as "allow all human resource documents to be viewed only in offices that belong to people reporting to the human resource manager." More simply, classes of locations could just be secure offices as opposed to public/open meeting spaces or hallways. In other embodiments, classes of locations could be single or multiple rooms, floors, buildings and other suitable locations. In addition, the system may incorporate other restrictions, such as days of week and/or time of day restrictions, when a specific document of a class of documents can only be viewed during pre-determined days and/or hours, for example, during workdays from 8 am to 6 pm.

Figure 3A:
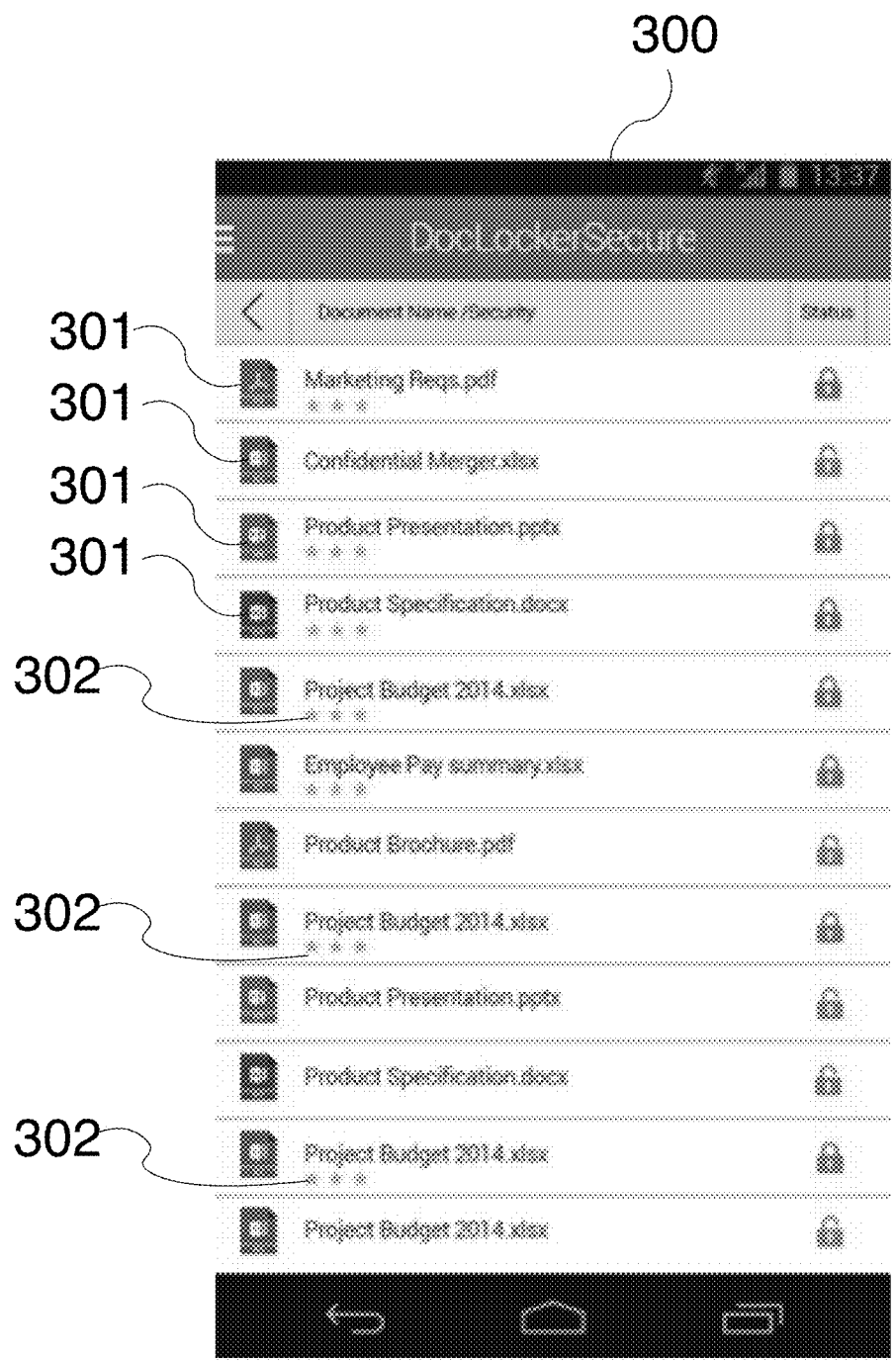
FIGS. 3(a), 3(b) and 3(c) illustrate exemplary embodiments of a graphical user interface of the document viewing application executing on the on the user's mobile device.
Figure 3B:
Figure 3C:
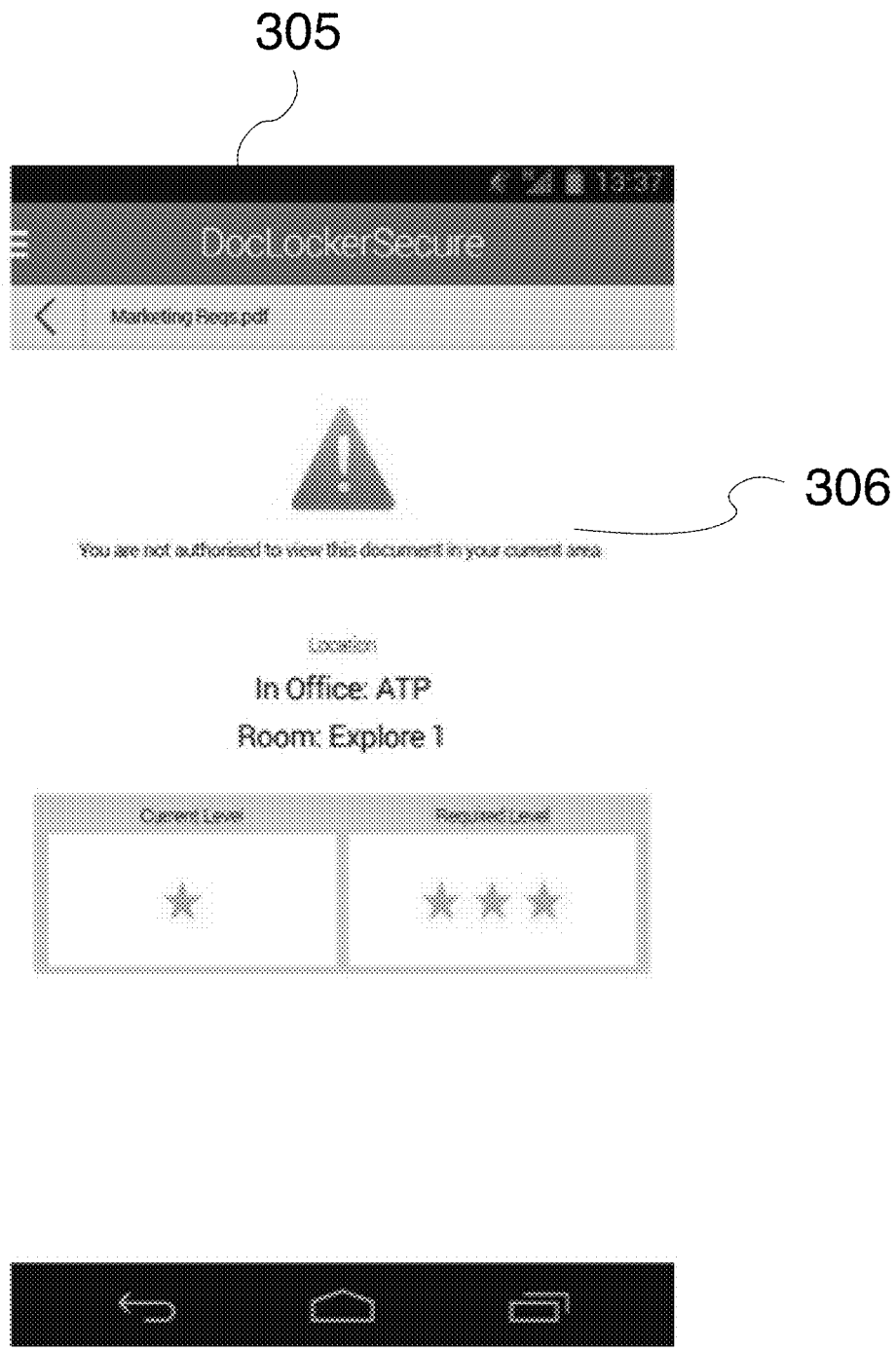

FIGS. 3(a), 3(b) and 3(c) illustrate exemplary embodiments of a graphical user interface of the document viewing application 104 executing on the on the user's mobile device 102. This application works in conjunction with the location-based secure document access system illustrated in FIG. 1 and described herein. FIG. 3(a) illustrates a portion of the user interface 300 including a list of secure documents 301, with a star level 302 indicating the room level security/privacy class that the user's mobile device needs to be located in to be able to view the respective document. FIG. 3(b) illustrates an exemplary screen with secure view 304 of the document 303. Finally, FIG. 3(c) illustrates an exemplary view 305 of the error message 306, which is displayed to the a user when the user trying to access a document in a location that does not meet the security requirements set by the document owner.

As would be appreciated by persons of ordinary skill in the art, in some cases, it is not only important to control where the document is viewed, but also to ensure that there are other key people in the room to witness the viewing. For example, one might want to ensure that the document's content is not being duplicated, such as by taking a picture of the device or transcribing content. If the document(s) are being digitally signed, the presence of other individuals could also be used to record witnesses to the signing. To support these cases, the document protection can in addition to location also specify that a minimum of n additional people (identified as individuals or roles) must be co-present. In an alternative embodiment, the system may require that only persons with a predetermined security clearance level are present in the same room where the document is opened. The document viewing application 104 would not open a document in a mobile device belonging to any person without security clearance is present in the same location, as determined using the location determination functionality described above. In yet alternative embodiment, the secure document access system may use access control lists, such as black lists and/or white lists well known to persons of ordinary skill in the art. The white and/or black lists may include lists of persons or locations that are permitted and/or prohibited from viewing the specific documents or classes of documents.

In one or more embodiments, the mechanism for handling document access with is similar to that described above, except that the document viewing application 104 has to be aware of other people in the room, not only his own location. To this end, the document server 108 with its access control engine 109 is used as the arbiter of whether the document is authorized to be viewed at any moment. When the document protection requires additional people to be present, the document server 108 communicates with the location server 105 to determine whether enough additional people having the specified identities or roles are present in the same location as the requesting document viewer. It should be noted that, in one or more embodiments, the additional people are also required to carry mobile devices running the document viewing application 104, and while the document is open in the room, those mobile devices must also increase their frequency of location reporting, so that the document server 108 can shut off access to the document in a timely manner when enough of those people leave the authorized area.

In one or more embodiments, in contrast to the embodiment described above, which controls document access based on presence or absence of co-located individuals, a document owner may not wish to restrict access based on individuals present but simply collect information on when the document was viewed and who was in the room when it was viewed. This could be useful in situations where a data or information breach was detected and sourced to content in a specific document. To this end, the access control engine 109 may be configured to maintain an access log containing unique identifiers of all users (or user's mobile devices), which had access or potential access (due to being in the same location with accessing user) to each specific document stored in the document database 110. Certain additional information, such as date/time/duration of each access as well as identities of co-located users (or users' mobile devices) may be stored in the aforesaid access log. Using such access log, the owner of the document could query it, post-hoc and determine who was physically capable of viewing the document.

In one or more embodiments, to protect against situations where the mobile device 102 is stolen or used by a non-authorized individual, multi-factor authentication could be used. For instance, when the mobile device 102 is determined to be located within an allowed room in the manner described above, the document access system may be additionally configured to query the user for a pin, password or a fingerprint. On smartphones and tablet computers, more sophisticated controls could be used, such as gestures or using the camera to recognized user's faces or features within the physical room, such as mystery codes in the wall art. In one or more embodiments, two-factor authentication could also be used for identifying witnesses, requiring those individuals to also supply additional credentials, such as a pin, password or a fingerprint, to allow the individual access to the document.

As would be appreciated by persons of ordinary skill in the art, the described access management system 100 is not limited to paper-like documents only. The described location-based access control concepts may be used in connection with any type of content, including any audiovisual content such as images, video and/or audio content. In various embodiments, the techniques described herein as being implemented on the servers 105 and 108 may instead be implemented partially or entirely on the mobile device 102 of the user. In this case, one or more of the location classifier 106, the location database 107, the access control engine 109 and/or the document database 110 may be deployed on the user's mobile device 102 instead of being deployed on the respective servers 105 and 108. In yet alternative embodiments, the location classifier 106, the location database 107, the access control engine 109 and/or the document database 100 may be deployed in the cloud.

Figure 4:
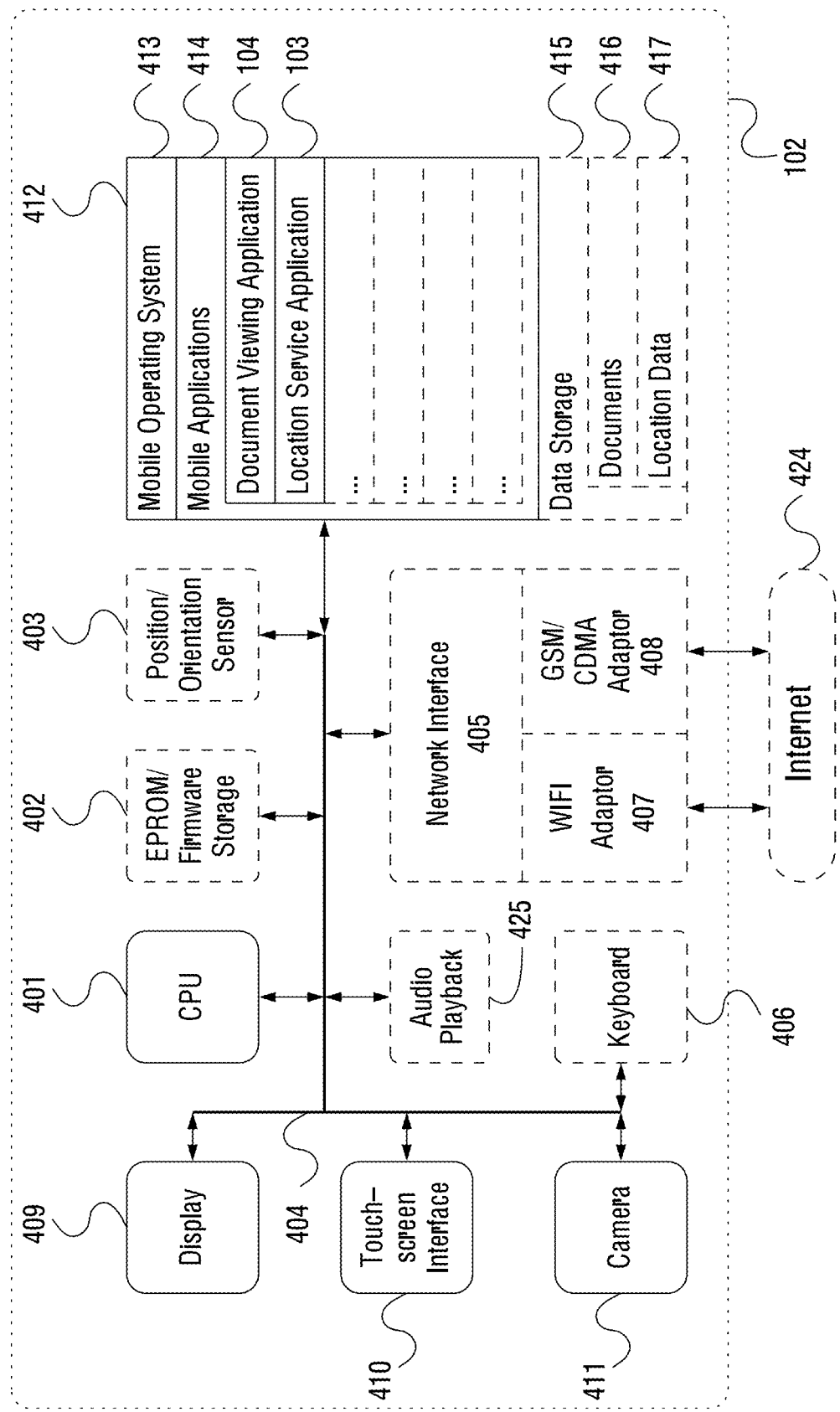
FIG. 4 illustrates an exemplary embodiment of a computerized mobile system that could be used as the user's mobile device in connection with the system for enabling secure location-based access to documents illustrated in FIG. 1.

FIG. 4 illustrates an exemplary embodiment of a computerized mobile system that could be used as the user's mobile device 102 in connection with the system 100 for enabling secure location-based access to documents illustrated in FIG. 1. In one or more embodiments, the computerized mobile system 102 may be implemented within a form factor of a mobile computing device, such as a smartphone, a personal digital assistant (PDA), a tablet computer, or a smart watch, all of which are widely available commercially and are well known to persons of skill in the art.

The computerized system 102 may include a data bus 404 or other interconnect or communication mechanism for communicating information across and among various hardware components of the mobile computerized system 102, and a central processing unit (CPU or simply processor) 401 coupled with the data bus 404 for processing information and performing other computational and control tasks. Computerized system 102 also includes a memory 412, such as a random access memory (RAM) or other dynamic storage device, coupled to the data bus 404 for storing various information as well as instructions to be executed by the processor 401. The memory 412 may also include persistent storage devices, such as a magnetic disk, optical disk, solid-state flash memory device or other non-volatile solid-state storage devices.

In one or more embodiments, the memory 412 may also be used for storing temporary variables or other intermediate information during execution of instructions by the processor 401. Optionally, computerized system 102 may further include a read only memory (ROM or EPROM) 402 or other static storage device coupled to the data bus 404 for storing static information and instructions for the processor 401, such as firmware necessary for the operation of the computerized system 102, basic input-output system (BIOS), as well as various configuration parameters of the computerized system 102.

In one or more embodiments, the computerized system 102 may incorporate a display device 409, which may be also coupled to the data bus 404, for displaying various information to a user of the computerized system 102. In an alternative embodiment, the display device 409 may be associated with a graphics controller and/or graphics processor (not shown). The display device 409 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 409 may be incorporated into the same general enclosure with the remaining components of the computerized system 102. In an alternative embodiment, the display device 409 may be positioned outside of such enclosure.

In one or more embodiments, the computerized system 102 may further incorporate an audio playback device 425 connected to the data bus 404 and configured to play various audio files and streams, such as MPEG-3 files, or audio tracks of various video files, such as MPEG-4 files, well known to persons of ordinary skill in the art. To this end, the computerized system 102 may also incorporate waive or sound processor or a similar device (not shown).

In one or more embodiments, the computerized system 102 may incorporate one or more input devices, such as a touchscreen interface 410 for receiving tactile commands, a camera 411 for acquiring still images and video of various objects, such as user's faces or room surroundings, as well as a keyboard 406, which all may be coupled to the aforesaid data bus 404 for communicating information, including, without limitation, images and video, as well as user command selections to the processor 401. In an alternative embodiment, input devices may include a system for tracking eye movements of the user (not shown), which may be used to indicate to the computerized system 102 the command selection by the user.

In one or more embodiments, the computerized system 102 may additionally include a positioning and orientation module 403 configured to supply data on the current location of the computerized system 102, spatial orientation as well as acceleration of the computerized system 102 to the processor 401 via the data bus 404. The geographical position information may be obtained by the positioning module 403 using, for example, the aforesaid location devices 101, such as iBeacons, a global positioning system (GPS) technology and/or other positioning techniques such as by using information provided by proximate cell towers and/or WIFI hotspots. The acceleration data is supplied by one or more accelerometers incorporated into the positioning and orientation module 403. Finally, the orientation information may be obtained using acceleration measurements in all 3 axes, including the gravity. In one or more embodiments, the position, orientation and acceleration metadata provided by the positioning and orientation module 403 is continuously recorded and stored in the data storage unit 415.

In one or more embodiments, the computerized system 102 may additionally include a communication interface, such as a network interface 405 coupled to the data bus 404. The network interface 405 may be configured to establish a connection between the computerized system 102 and the Internet 424 using at least one of WIFI interface 407 and the cellular network (GSM or CDMA) adaptor 408. The network interface 405 may be configured to provide a two-way data communication between the computerized system 102 and the Internet 424. The WIFI interface 407 may operate in compliance with 802.11a, 802.11b, 802.11g and/or 802.11n protocols as well as Bluetooth protocol well known to persons of ordinary skill in the art. In an exemplary implementation, the WIFI interface 407 and the cellular network (GSM or CDMA) adaptor 408 send and receive electrical or electromagnetic signals that carry digital data streams representing various types of information.

In one or more embodiments, the Internet 424 typically provides data communication through one or more subnetworks to other network resources. Thus, the computerized system 102 is capable of accessing a variety of network resources located anywhere on the Internet 424, such as remote document servers 108, location servers 105, web servers, other content servers as well as other network data storage resources. In one or more embodiments, the computerized system 102 is configured send and receive messages, media and other data, including application program code, through a variety of network(s) including Internet 424 by means of the network interface 405. In the Internet example, when the computerized system 102 acts as a network client, it may request code or data for an application program executing on the computerized system 102. Similarly, it may send various data or computer code to other network resources.

In one or more embodiments, the computerized system 102 uses the network interface 405 to send request(s), via the Internet 424, such as HTTP requests, to the document server 108 and the location server 105 and receive various information, including the aforesaid secure access documents, therefrom.

In one or more embodiments, the functionality described herein is implemented by computerized system 102 in response to processor 401 executing one or more sequences of one or more instructions contained in the memory 412. Such instructions may be read into the memory 412 from another computer-readable medium. Execution of the sequences of instructions contained in the memory 412 causes the processor 401 to perform the various process steps described herein. In alternative embodiments, hardwired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 401 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 401 for execution. For example, the instructions may initially be carried on a magnetic disk from a remote computer. Alternatively, a remote computer can load the instructions into its dynamic memory and send the instructions over the Internet 424. Specifically, the computer instructions may be downloaded into the memory 412 of the computerized system 102 from the foresaid remote computer via the Internet 424 using a variety of network data communication protocols well known in the art.

In one or more embodiments, the memory 412 of the computerized system 102 may store any of the following software programs, applications or modules:

1. Operating system (OS) 413, which may be a mobile operating system for implementing basic system services and managing various hardware components of the computerized system 102. Exemplary embodiments of the operating system 413 are well known to persons of skill in the art, and may include any now known or later developed mobile operating systems.

2. Mobile applications 414 may include, for example, a set of software applications executed by the processor 401 of the computerized system 102, which cause the computerized mobile system 102 to perform certain predetermined functions, such as display the graphical user interfaces shown in FIGS. 3(*a*), 3(*b*) and 3(*c*) on the display device 409. In one or more embodiments, the mobile applications 414 may the inventive document viewing application 104 and the inventive location service application 103.

3. Data storage 415 may be used, for example, for storing the downloaded documents 416 as well as the location data 417 of the computerized mobile system 102.

Figure 5:
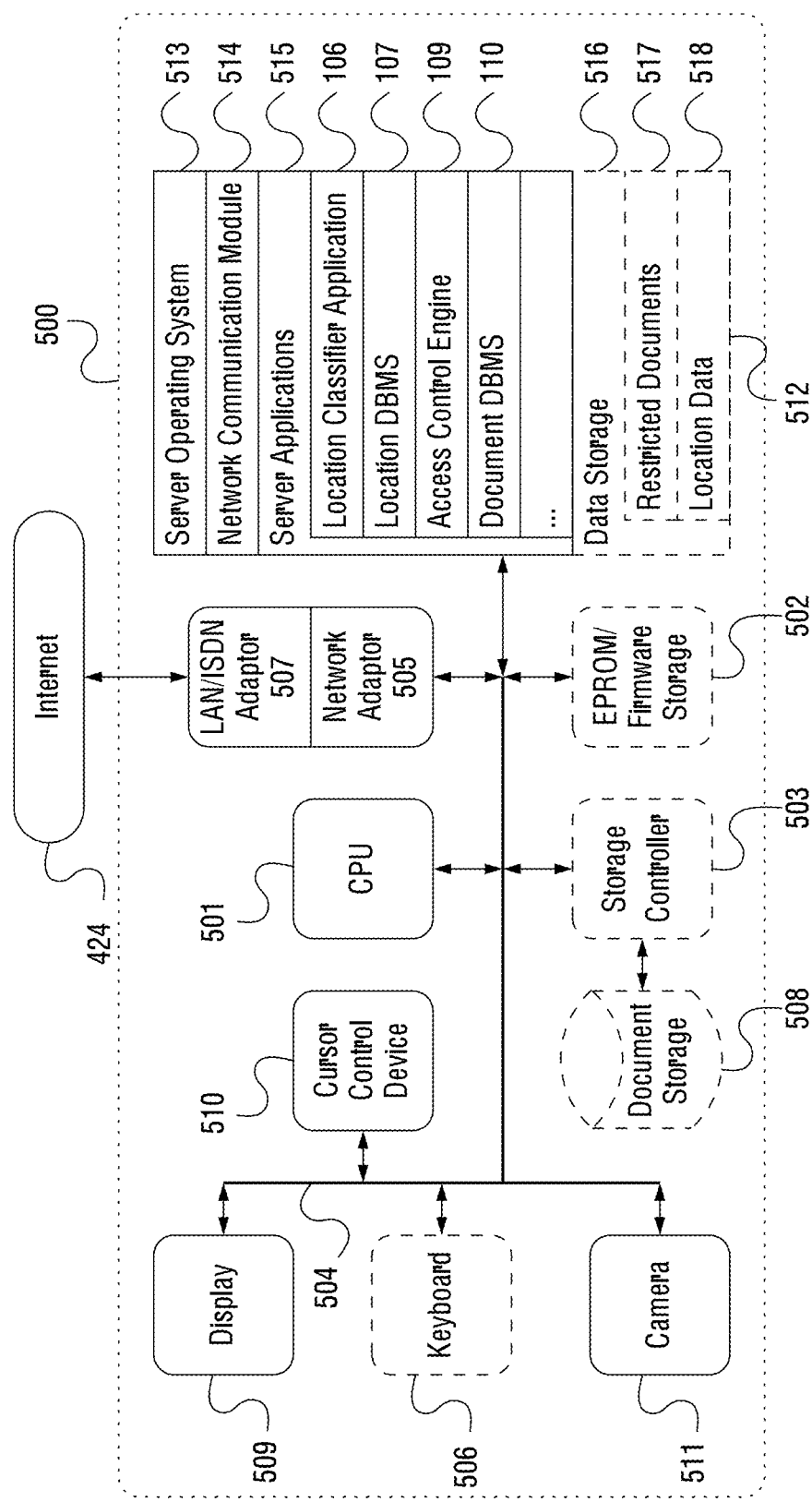
FIG. 5 illustrates an exemplary embodiment of a computerized server system, which could be used as the location server and/or as the document server of the system for enabling secure location-based access to documents illustrated in FIG. 1.

FIG. 5 illustrates an exemplary embodiment of a computerized server system 500 which could be used as the location server 105 and/or as the document server 108 of the system 100 for enabling secure location-based access to documents illustrated in FIG. 1.

In one or more embodiments, the computerized server system 500 may incorporate a data bus 504, which may be substantially similar and may perform substantially similar functions as the data bus 404 of the computerized system 102 illustrated in FIG. 4. In various embodiments, the data bus 504 may use the same or different interconnect and/or communication protocol as the data bus 404. The one or more processors (CPUs) 501, the network adaptor 505, the EPROM/Firmware storage 502, the display device 509 and the keyboard 506 of the computerized server system 500 may be likewise substantially similar to the respective processor 401, the network interface 405, the EPROM/Firmware storage 402, the display device 409 and the keyboard 406 of the computerized system 102, except that the former components are deployed in a server platform configuration. In various implementations, the one or more processor 501 may have substantially increased processing power as compared with the processor 401.

In addition to the input device 506 (keyboard), the computerized server system 500 may additionally include a cursor control device 510, such as a mouse, a trackball, or cursor direction keys for communicating direction information and command selections to processor 501 and for controlling cursor movement on the display device 509. This input device typically has two degrees of freedom in two axes, a first axis (e.g., x) and a second axis (e.g., y), that allows the device to specify positions in a plane.

The LAN/ISDN adaptor 507 of the computerized server system 500 may be implemented, for example, using an integrated services digital network (ISDN) card or a modem to provide a data communication connection to a corresponding type of telephone line, which is interfaced with the Internet 424 using Internet service provider's hardware (not shown). As another example, the LAN/ISDN adaptor 507 may be a local area network interface card (LAN NIC) to provide a data communication connection to a compatible LAN and the Internet 424. To store various media files, the computerized server system 500 may be provided with document storage 508, for storing various content to be displayed to the user, such as the restricted access documents, which is connected to the data bus 504 by means of a storage controller 503. The camera 511 may be used to acquire images and/or video of various objects.

In one or more embodiments, the memory 512 of the computerized server system 500 may store any of the following software programs, applications, modules and/or data:

1. A server operating system (OS) 513, which may be an operating system for implementing basic system services and managing various hardware components of the computerized server system 500. Exemplary embodiments of the server operating system 513 are all well known to persons of skill in the art, and may include any now known or later developed operating systems.

2. A network communication module 514 may incorporate, for example, one or more network protocol stacks which are used to establish a networking connection between the computerized server system 500 and the various network entities of the Internet 424, such as the computerized mobile system 102, using the network adaptor 505 working in conjunction with the LAN/ISDN adaptor 507.

3. Server applications 515 may include, for example, a set of software applications executed by one or more processors 501 of the computerized server system 500, which cause the computerized server system 500 to perform certain predetermined functions or tasks. In one or more embodiments, the server applications 515 may include the location classifier application 106, the location database management system 107, the access control engine 109 and the document database management system 110.

4. Data storage 516 may be used, for example, for storing the restricted access documents 517 described in detail hereinabove as well as location data 518, described above, which may be stored in a form of database tables.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for secure location-based document access. It is intended that the specification and examples be considered as exemplary only, with a true scope and spirit of the invention being indicated by the following claims.

What is claimed is:

1. A computer-implemented method, the method being performed in a computerized system comprising a location server, a document server, a user device, at least one central processing unit, a localization signal receiver, a display and at least one memory, the computer-implemented method comprising:
   a. storing content in association with a plurality of content access rules in the document server, the plurality of content access rules comprising one or more authorized location identifiers of locations authorized for displaying of the content;
   b. receiving a plurality of localization signals from a plurality of radio frequency beacons disposed within a plurality of rooms of a building using the localization signal receiver of the user device, wherein each of the plurality of the localization signals comprises a unique beacon identifier;
   c. at the location server, receiving the plurality of localization signals and a device identifier from the user device, determining a location of the user device based on a strength of each of the received plurality of localization signals and each of the unique beacon identifiers, and storing a location identifier for the determined location of the user device in association the device identifier of the user device;
   d. receiving, at the document server, a request from the user device for content, the request comprising a content identifier uniquely identifying the requested content and the device identifier of the user device;
   e. transmitting, by the document server, the device identifier to the location server and retrieving the location identifier associated with the device identifier;
   f. determining whether the requested content is sensitive content or non-sensitive content;
   g. at the document server, determining whether the retrieved location identifier corresponds to one of the authorized location identifiers included in the plurality of content access rules associated with the content identifier; and
   h. in response to determining that the requested content is sensitive content, providing the requested content to the user only when the received location identifier corresponds to one of the authorized location identifiers, wherein determining the location of the user device based on the strength of each of the received plurality of localization signals comprises fingerprinting the received plurality of localization signals from the plurality of radio frequency beacons.

2. The computer-implemented method of claim 1, further comprising receiving additional localization signals; updating the location of the user device based on the additional localization signals; using the plurality of content access rules to determine whether the requested content is authorized to be accessed from the updated location; and withholding content from the user if the content is not authorized to be accessed from the updated location.

3. The computer-implemented method of claim 2, wherein the plurality of content access rules specify at least one identifier of an additional mobile computing device required to be present at the determined location in order for the content to be authorized to be accessed.

4. The computer-implemented method of claim 2, wherein the plurality of content access rules comprise information identifying one or more additional mobile computing devices required to be not present at the determined location in order for the content to be authorized to be accessed.

5. The computer-implemented method of claim 1, wherein the content is a document.

6. The computer-implemented method of claim 1, wherein the plurality of radio frequency beacons are disposed in a room of the building.

7. The computer-implemented method of claim 6, wherein the location is determined with a room-level accuracy.

8. The computer-implemented method of claim 1, wherein the localization signals further comprise a coded lighting signal and wherein the localization signal receiver is a light sensitive device.

9. The computer-implemented method of claim 1, wherein the localization signals further comprise a wireless local area network (WLAN) signal and wherein the localization signal receiver is a WLAN communication interface.

10. The computer-implemented method of claim 1, wherein the localization signals further comprise a GPS signal and wherein the localization signal receiver is a GPS receiver.

11. The computer-implemented method of claim 1, wherein the location identifier corresponding to the determined location is stored in a location database.

12. The computer-implemented method of claim 11, wherein determining whether the requested content is authorized to be accessed from the determined location comprises querying the location database.

13. The computer-implemented method of claim 1, wherein determining whether the requested content is authorized to be accessed from the determined location comprises sending a network request to an access control engine.

14. The computer-implemented method of claim 1, further comprising storing, on a non-transitory computer readable medium, information on relating to all mobile devices present at the determined location when the content was provided to the user.

15. The computer-implemented method of claim 1, wherein determining a location based on the received localization signals comprises determining a distance between the localization signal receiver and a source of the localization signal.

16. The computer-implemented method of claim 1, wherein the localization signal receiver receives at least two localization signals and selects strongest of the two received localization signals for determining the location.

17. The computer-implemented method of claim 1, further comprising generating a searchable log comprising information on the determined location, the requested content and a current time associated with each instance of the provision of the requested content to the user.

18. The computer-implemented method of claim 1, wherein the plurality of content access rules comprises one or more authorized device identifiers of user devices of user devices authorized to access the content, wherein if the requested content is the sensitive content, the requested content is provided to the user only if the device identifier corresponds to one of the authorized device identifiers.

19. The computer-implemented method of claim 1, wherein the content is stored in an encrypted form on the user device, and wherein providing the requested content to the user only when the received location identifier corresponds to one of the one of the authorized location identifiers, comprises providing a decryption key for decrypting the encrypted content.

20. A non-transitory computer-readable medium embodying a set of computer-executable instructions, which, when executed in connection with a computerized system comprising a location server, a document server, a user device, at least one central processing unit, a localization signal receiver, a display and at least one memory, cause the computerized system to perform a method comprising:
a. storing content in association with a plurality of content access rules in the document server, the plurality of content access rules comprising one or more authorized location identifiers of locations authorized for displaying of the content;
b. receiving a plurality of localization signals from a plurality of radio frequency beacons disposed within a plurality of rooms of a building using the localization signal receiver of the user device, wherein each of the plurality of the localization signals comprises a unique beacon identifier;
c. at the location server, receiving the plurality of localization signals and a device identifier from the user device, determining a location of the user device based on a strength of each of the received plurality of localization signals and each of the unique beacon identifiers, and storing a location identifier for the determined location of the user device in association the device identifier of the user device;
d. receiving, at the document server, a request from the user device for content, the request comprising a content identifier uniquely identifying the requested content and the device identifier of the user device;
e. transmitting, by the document server, the device identifier to the location server and retrieving the location identifier associated with the device identifier;
f. determining whether the requested content is sensitive content or non-sensitive content;
g. at the document server, determining whether the retrieved location identifier corresponds to one of the authorized location identifiers included in the plurality of content access rules associated with the content identifier; and
h. in response to determining that the requested content is sensitive content, providing the requested content to the user only when the received location identifier corresponds to one of the authorized location identifiers, wherein determining the location of the user device based on the strength of each of the received plurality of localization signals comprises fingerprinting the received plurality of localization signals from the plurality of radio frequency beacons.

21. A computerized system comprising a location server, a document server, a user device, at least one central processing unit, a localization signal receiver, a display and at least one memory, the at least one memory storing a set of computer-executable instructions causing the computerized system to perform a method comprising:
a. storing content in association with a plurality of content access rules in the document server, the plurality of content access rules comprising one or more authorized location identifiers of locations authorized for displaying of the content;
b. receiving a plurality of localization signals from a plurality of radio frequency beacons disposed within a plurality of rooms of a building using the localization signal receiver of the user device, wherein each of the plurality of the localization signals comprises a unique beacon identifier;
c. at the location server, receiving the plurality of localization signals and a device identifier from the user device, determining a location of the user device based on a strength of each of the received plurality of localization signals and each of the unique beacon identifiers, and storing a location identifier for the determined location of the user device in association the device identifier of the user device;
d. receiving, at the document server, a request from the user device for content, the request comprising a content identifier uniquely identifying the requested content and the device identifier of the user device;
e. transmitting, by the document server, the device identifier to the location server and retrieving the location identifier associated with the device identifier;
f. determining whether the requested content is sensitive content or non-sensitive content;
g. at the document server, determining whether the retrieved location identifier corresponds to one of the authorized location identifiers included in the plurality of content access rules associated with the content identifier; and
h. in response to determining that the requested content is sensitive content, providing the requested content to the user only when the received location identifier corresponds to one of the authorized location identifiers, wherein determining the location of the user device based on the strength of each of the received plurality of localization signals comprises fingerprinting the received plurality of received localization signals from the plurality of radio frequency beacons.

\* \* \* \* \*